United States Patent [19]
Chen

[11] Patent Number: 6,065,849
[45] Date of Patent: May 23, 2000

[54] AQUARIUM LIGHT FIXTURE

[76] Inventor: Ming-Chih Chen, No. 3, Aly. 34, Ln. 413, Ying Tao Rd., YingKe Town, Taipei, Taiwan

[21] Appl. No.: 09/183,855

[22] Filed: Oct. 30, 1998

[51] Int. Cl.[7] ............................. F21V 33/00; F21V 21/00; F21S 3/00
[52] U.S. Cl. ......................... 362/101; 362/219; 362/396
[58] Field of Search ................................. 362/101, 219, 362/225, 226, 249, 431, 432, 396

[56] References Cited

U.S. PATENT DOCUMENTS

| | | | |
|---|---|---|---|
| 2,740,883 | 4/1956 | Kruger | 362/219 |
| 4,535,393 | 8/1985 | Aspenwall | 362/217 |

*Primary Examiner*—Jon Henry
*Attorney, Agent, or Firm*—W. Wayne Liauh

[57] ABSTRACT

An aquarium light fixture includes a plural number of brackets for supporting an aquarium light assembly on an aquarium. Each bracket includes a base, a pair of arms in U-shaped and a slide block at the top of each arm. The slide block is slidably engageable with a longitudinal groove formed in each of two lateral side walls of the light assembly. The base further has a plural number of spaced wedge feet extending downward for clamping a top portion of the aquarium slidewall. Therefore two brackets mounting on two opposite sidewalls may support the aquarium light assembly like a bridge manner. The bracket may be adapted easily and flexibly to different size of aquariums.

9 Claims, 6 Drawing Sheets

AQUARIUM LIGHT FIXTURE

BACKGROUND OF THE INVENTION

1. Field of the Invention

This invention relates to an aquarium light fixture and particularly to an aquarium light fixture that is able to mount on the walls of the aquarium.

2. Description of the Prior Art

Conventional aquarium light that uses halogen lamp or fluorescent lamp usually is hung above the aquarium by means of a rope or a string. It needs to fix a nail under the ceiling and to tie a piece of rope or string on the nail for hanging the lamp above the aquarium. Once installed, it is difficult to move. The hanging lamp is prone to swing and may cause harm to people. It is also not sightly. Hence it gradually fades away from market. Most contemporary aquarium lights are made to order based on a specific size of the aquarium. The light fixture is fixed on the top of the aquarium with no rope to hang the lamp. Since it is made to order for each aquarium, it is less flexible and more expensive. When a user changes the aquarium of different size or type, the original light fixture becomes obsolete and useless. It is a waste of money and resources.

SUMMARY OF THE INVENTION

In view of aforesaid disadvantages, it is therefore an object of this invention to provide an aquarium light fixture that is flexible for fitting to different size of aquarium.

It is another object of this invention to provide an aquarium light fixture that enables plural number of aquarium lights to engage together in series so that it is even more convenient and flexible to use.

The aquarium light fixture according to this invention includes an aquarium light assembly supported by a plural number of brackets which are mounted on aquarium lateral walls. The aquarium light assembly has two longitudinal side grooves formed respectively on two lateral walls thereof. Each bracket has a base which has wedge feet to engage with the lateral walls of the aquarium, a pair of U-shaped arms each has one end thereof fixed on the base and another end thereof connected with a slide block which is engageable with the side groove. With a pair of the brackets mounted on two lateral walls of the aquarium, different size of light assembly may be mounted on the brackets by slidably engaging the side grooves with the slide blocks. Since each bracket is mounted on a side wall, this bracket may fixe equally well for any size of aquarium as long as the wedge feet can fit the side wall.

Furthermore a wedge member may be provided to engages the grooves of two light assemblies so that more than one light assembly may be connected together end to end to form a light assembly of various length. It makes this invention even more flexible and convenient to use.

BRIEF DESCRIPTION OF THE DRAWINGS

The invention as well as its many advantages, may be further understood by the following detailed description and drawings in which.

DETAILED DESCRIPTION OF THE PREFERRED EMBODIMENT

Figure 1:
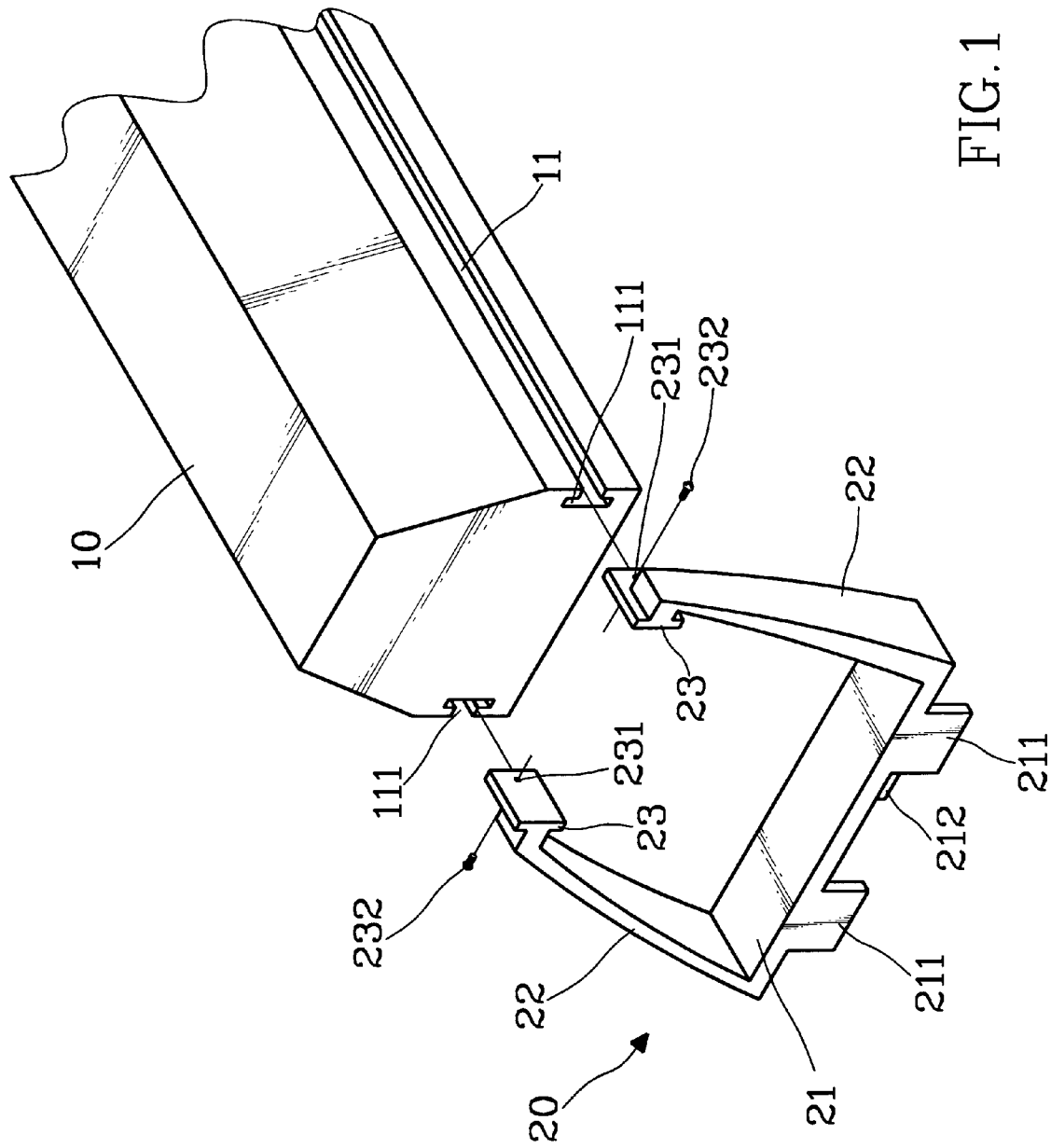
FIG. 1 is an exploded view of this invention.
Figure 2:
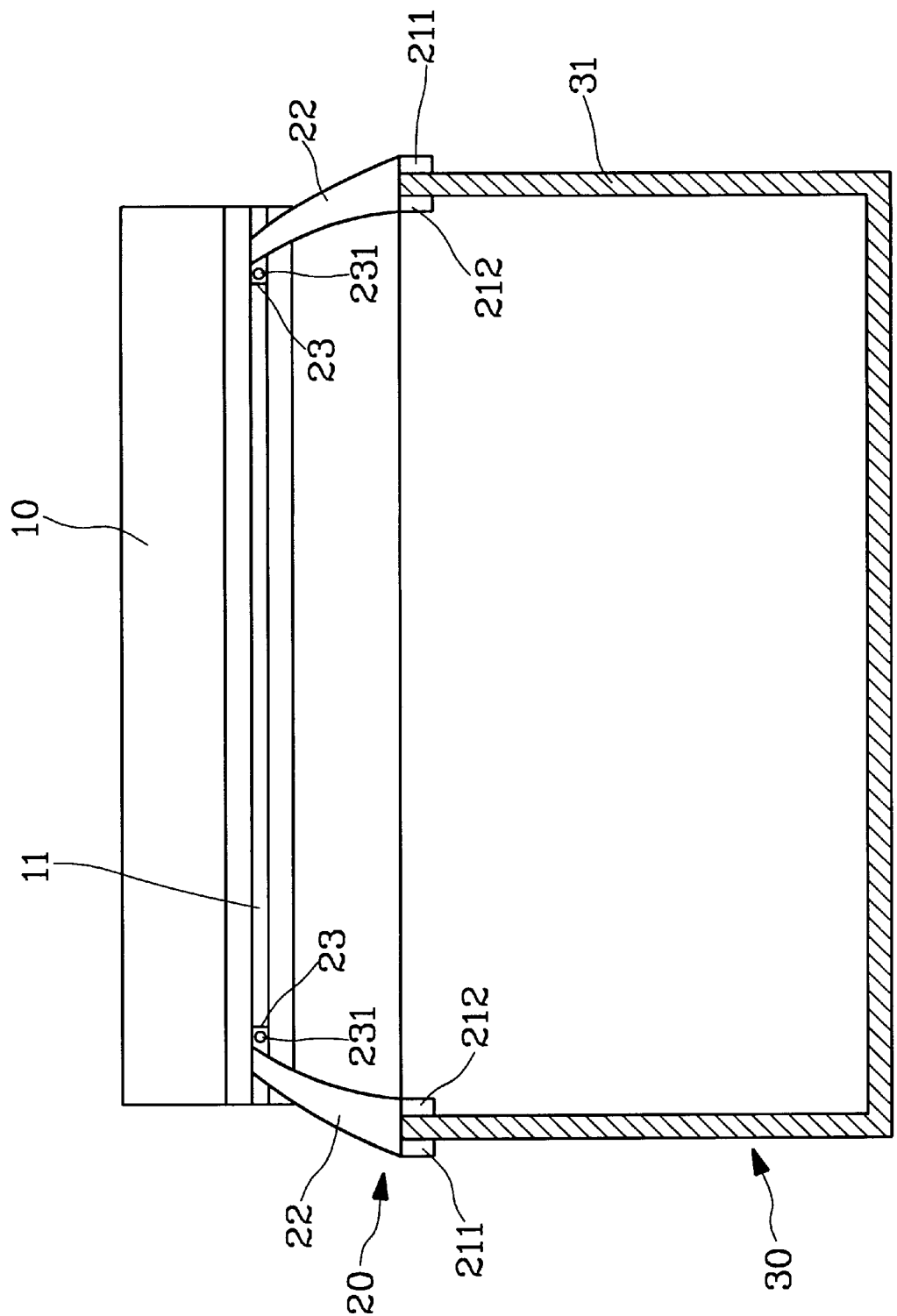
FIG. 2 is a cross sectional view of this invention in use.

Referring to FIGS. 1 and 2, the aquarium light fixture according to this invention includes an aquarium light assembly 10 and a plural number of brackets 20 for supporting the light assembly 10 to lateral side walls 31 of an aquarium 30. The aquarium light assembly 10 may be made by nonmetallic material such as plastics, acrylic or metallic material such as aluminum or steel.

The aquarium light assembly 10 includes lamps (not shown in the figures), switches or control circuits (also not shown in the figures). All these components are known in the arts and form no part of this invention, thus will be omitted herein.

The light assembly 10 has a longitudinal side groove 11 in each of two lateral walls with two groove openings 111 at both ends of the assembly.

The bracket 20 includes a base 21, a pair of arms 22 in U-shaped and a slide block 23 at the top of each arm. Below the base 21, there are a plural number of protrusive wedge feet 211 and 212 alternately formed and spaced from each other for clamping a side wall 31 of the aquarium 30 when in use. The space distance between the wedge feet 211 and 212 is no less than the thickness of the side wall 31.

The slide block 23 has a cross section mating with that of the side groove 11 and engageable with the side groove 11 when in use. Hence a pair of the brackets 20 may support the light assembly 10 securely on the side walls 31 like a bridge. To prevent the light assembly 10 from accidentally slipping away from the brackets, the side block 23 may have a screw aperture 231 formed therein to allow a screw 232 to engage the slide block 23 firmly to the light assembly 10. As the bracket 20 is mounted on the side wall of the aquarium 10, it can be used on any size of aquarium to suit any size of light assembly 10 that fits the aquarium as long as the aquarium has same wall thickness. It thus is flexible and less expensive than conventional made-to-order one.

The following offers more embodiments of this invention. Like components will be marked by like numerals with an affixed character.

Figure 3:
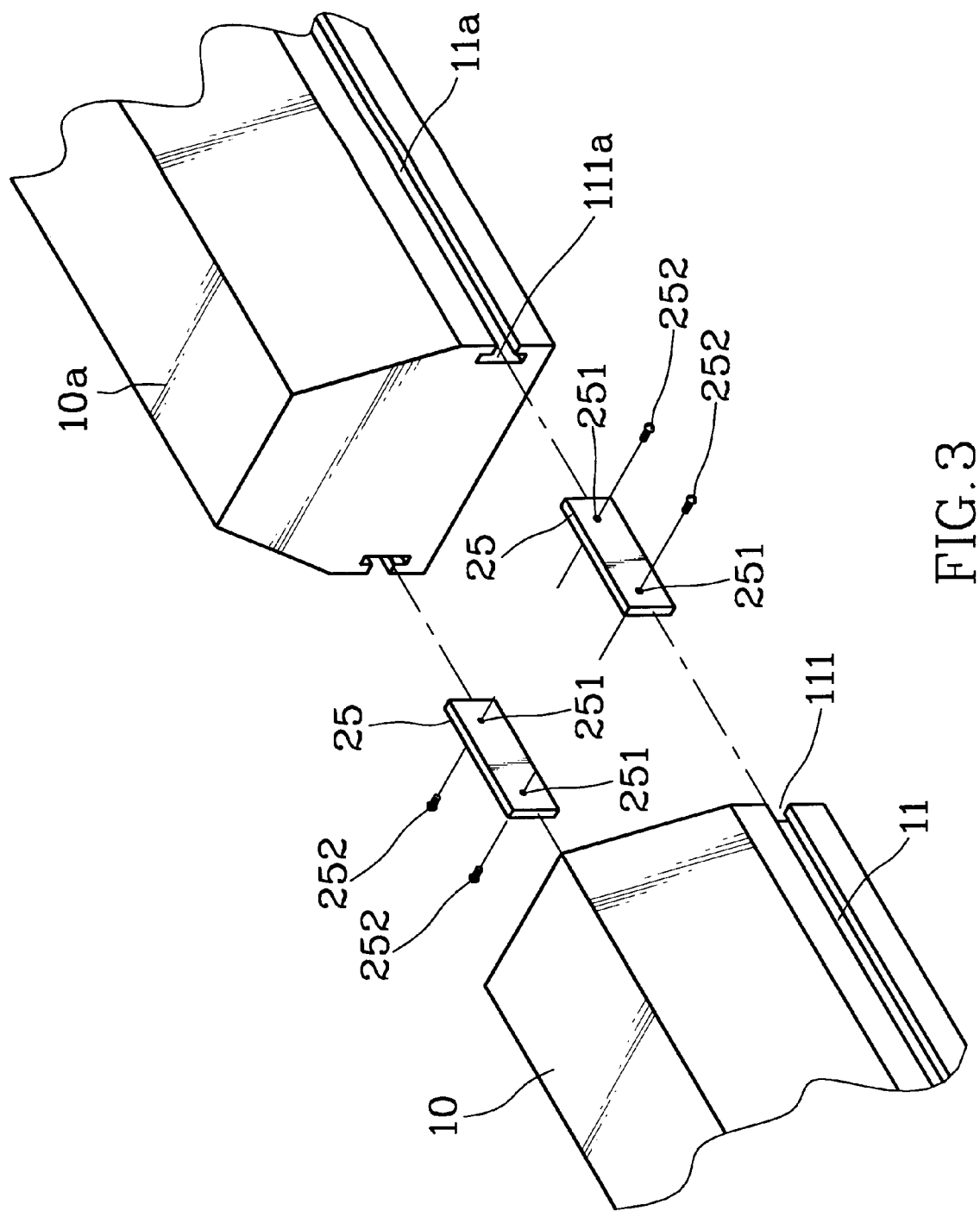
FIG. 3 is a fragmentary exploded view of two light assemblies being connected in series.

When a light assembly 10 is too short for an aquarium, two or more light assemblies may be longitudinally connected together to form a longer one to fit the aquarium. FIG. 3 shows such an embodiment. Two light assemblies 10 and 10a are connected together by a pair of wedge members 25 held in the side grooves 11 and 11a, then screws 252 are used to engage the wedge members 25 with the light assemblies 10 and 10a through screw apertures 251 formed in the wedge member 25.

Figure 4:
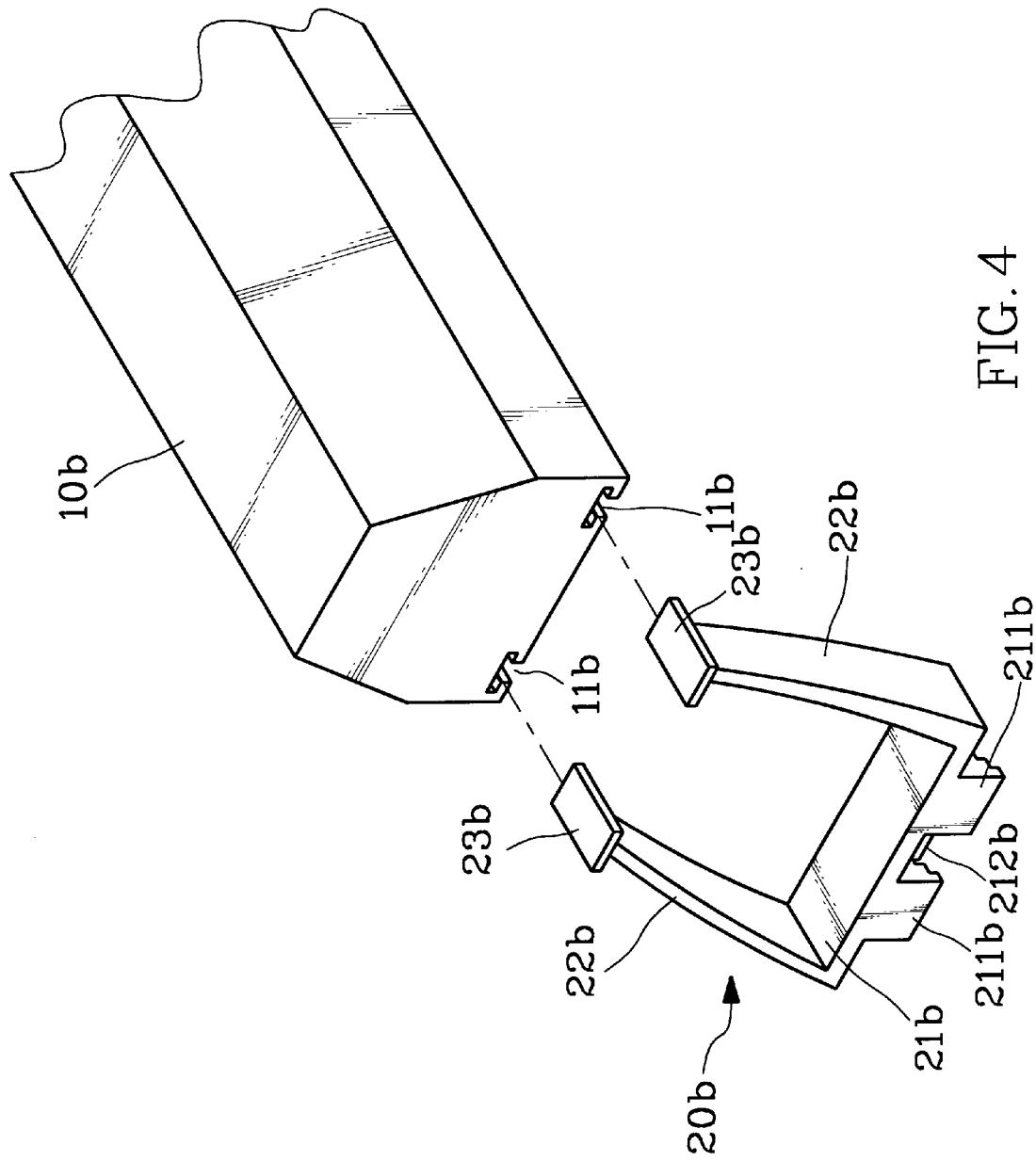
FIG. 4 is an exploded view of another embodiment of this invention.
Figure 5:
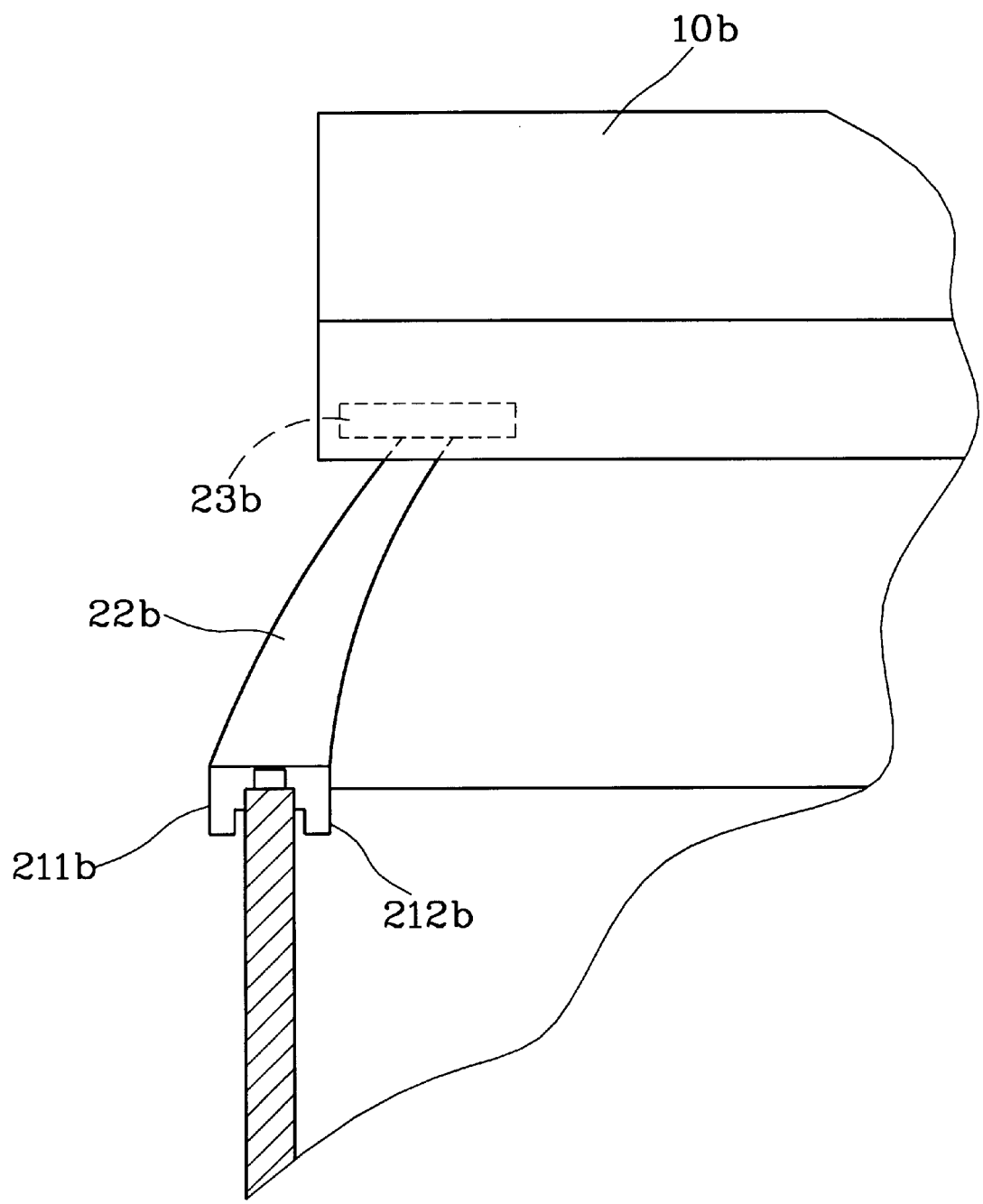
FIG. 5 is a fragmentary cross sectional view of the embodiment shown in FIG. 4.

FIGS. 4 and 5 show a further embodiment of this invention. It is generally like the one shown in FIG. 1. However instead of side grooves, a pair of spaced bottom grooves 11b is formed in a bottom wall of a light assembly 10b near the side edge thereof. The bracket 20b also has a base 21b, a pair of arms 22b in U-shaped and a slide block 23b mating and engageable with the bottom groove 11b. The wedge feet 211b and 212b have respectively step inside surfaces so that they can fit to different thickness of aquarium walls. It thus is even more flexible to use.

Figure 6:
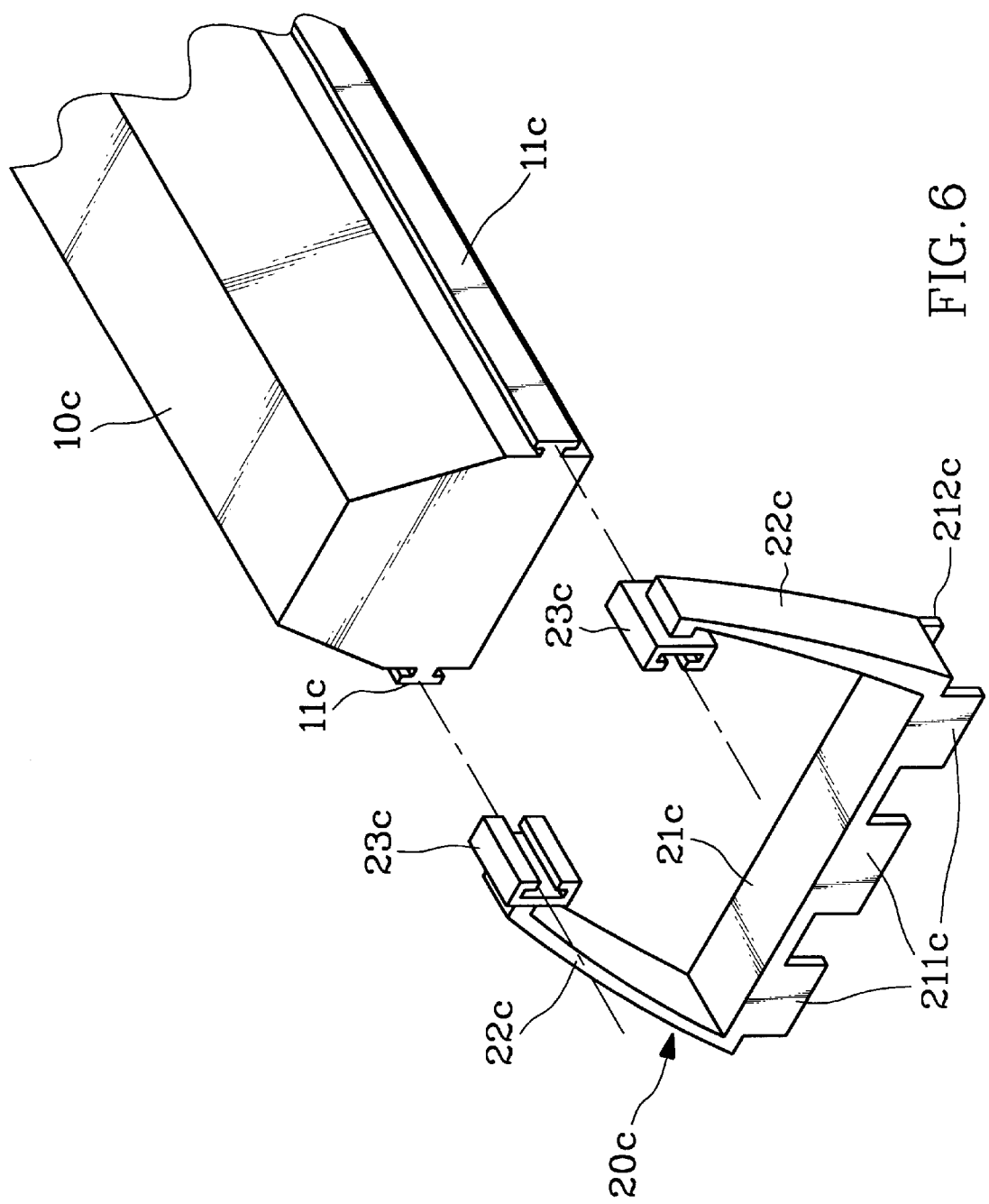
FIG. 6 is an fragmentary exploded view of a further embodiment of this invention.

FIG. 6 shows still another embodiment of this invention. Basically it is constructed like the one shown in FIG. 1.

However instead of side grooves, a pair of side rails 11c are formed at two lateral sides of the light assembly 10c. The bracket 20c has a pair of mating slide blocks 23c with inside grooves mating and engageable with the side rails 11c. The wedge feet 211c and 212c are opposite to each other rather than alternately positioned against each other. The number of wedge feet 211c and 212c may be any number desired, such as three, four or five.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An aquarium light fixture for supporting an aquarium light assembly on an aquarium, comprising:

at least one longitudinal side groove formed on each of two lateral sides of an aquarium light assembly; and a plural number of spaced brackets, each bracket including a base, a pair of arms formed in a substantially U-shaped manner and a slide block located at a top of each arm engageable with the side groove, the base having a plural number of wedge means thereunder engageable with a top portion of an aquarium side wall so that the spaced brackets are able to support the aquarium light assembly.

2. The aquarium light fixture of claim 1, wherein the base has a width greater than side wall thickness, the wedge means having at least one wedge foot extending respectively downward from each of two lateral sides of the base to form a space therebetween no less than the side wall thickness.

3. The aquarium light fixture of claim 2, wherein the wedge foot has a stepped inside surface to form a narrow space at an upper portion and a wide space of a lower portion.

4. The aquarium light fixture of claim 1, wherein the aquarium light assembly has an elongated body with two ends, the side groove having a groove opening at each end.

5. The aquarium light fixture of claim 4 further having a pair of wedge members engagable with two side grooves for connecting two aquarium light assemblies in series by end to end manner.

6. The aquarium light fixture of claim 4, wherein each lateral side of the aquarium light assembly has one side groove.

7. The aquarium light fixture of claim 4, wherein the slide block has an screw aperture to enable a screw to engage the slide block securely to the side groove.

8. An aquarium light fixture for supporting an aquarium light assembly on an aquarium, comprising:

a pair of spaced longitudinal bottom grooves formed on a bottom of an aquarium light assembly; and a plural number of spaced brackets, each bracket including a base, a pair of arms formed in a substantially U-shaped manner and a slide block located at a top of each arm engageable with the side groove, the base having a plural number of wedge means thereunder engageable with a top portion of an aquarium side wall so that the spaced brackets are able to support the aquarium light assembly.

9. The aquarium light fixture according to claim 8, wherein the aquarium light assembly has an elongated body with two ends, and each of the bottom grooves has a groove opening at its end.

* * * * *